United States Patent Office 3,029,186
Patented Apr. 10, 1962

3,029,186
METHOD AND COMPOSITIONS FOR TREATING LIVER FLUKES
Georg Lämmler, Frankfurt am Main, Heinz Loewe, Kelkheim (Taunus), and Gerhard Ross, Frankfurt am Main, Germany, assignors to Farbwerke Hoechst Aktiengesellschaft vormals Meister Lucius & Brüning, Frankfurt am Main, Germany, a corporation of Germany
No Drawing. Filed Sept. 9, 1959, Ser. No. 838,843
7 Claims. (Cl. 167—55)

This invention relates to pharmaceutical compositions containing trichloromethyl derivatives of benzene.

It is an object of the present invention to provide compositions effective against liver flukes (*Fasciola hepatica*).

Other objects of the invention are to provide suspensions for oral administration containing said compositions and to provide a method of treating animals against liver flukes (*Fasciola hepatica*) by orally administering said compositions. Further objects and features will be in part apparent and in part pointed out hereinafter.

In order to compat liver flukes in domestic animals there are applied in addition to Filix preparations above all high-chlorinated hydrocarbons such as hexachlorethane and carbon tetrachloride.

Carbon tetrachloride, however, is known to be used to cause liver injuries for the purpose of evaluation of protecting agents (Varga et al. Arzneimittelforschung 9, No. 4, page 215 to 217 [1959]).

The application of the above-mentioned preparations, particularly of carbon tetrachloride even in curative doses, sometimes causes toxications and even death. The strong heptatotoxic properties of carbon tetrachloride therefore exclude oral application in the treatment of *Fasciola hepatica* infections, for instance in cattle. The application of hexachlorethane and Filix preparations may likewise cause degenerative alterations of the liver and thereby lead to death.

On the basis of extended experimental investigations hexachlorethane has been considered the remedy of choice in combatting fasciolosis (Zeitschrift für Tropenmedizin und Parasitologie, vol. 7, pages 289 to 311 [1956]) envolving least side effects.

In accordance with the present invention, it has now been found that compositions containing a member of the group consisting of 1,4-bis-(trichloromethyl)-benzene, 1,3 - bis - (trichloromethyl)benzene, 1,3,5-tris-(trichloromethyl)-benzene and mixtures of said compounds are very effective against liver flukes in animals and free of undesirable toxic effects.

The pharmacologically effective compounds according to the present invention may be prepared according to the French Patent 798,727 granted December 5, 1934.

By chemotherapeutic examinations of albino rats, rabbits, sheep and cattle infected with *Fasciola hepatica* the values given in Table I were ascertained for the curative dose:

TABLE I

| Preparation | curative dose, mg./kg. albino rat per os | curative dose, mg./kg. rabbit per os | curative dose, mg./kg. sheep per os | curative dose, mg./kg. cattle per os |
|---|---|---|---|---|
| Hexachlorethane | 250 | 650 | 220-260 | 150-175 |
| 1, 4-bis-trichloromethyl-benzene | 55-60 | 450 | 150 | 125-130 |
| 1, 3-bis-trichloromethyl-benzene | 30-35 | 400 | 130 | 115-125 |
| 1, 3, 5-tris-trichloromethyl-benzene | 150 | 500 | 170 | 135-145 |

In further tests concerning the acute and chronic toxicity in the afore-mentioned animals the trichloromethyl-benzenes were well tolerated. No pathologic-histological modifications were found neither in liver nor in heart, lungs, kidneys or spleen when the curative and even higher doses were administered.

In contradistinction to carbon tetrachloride and hexachlorethane the compounds of the invention did not cause liver necrosis, degenerative alterations of the liver, disturbances of the liver functions or alterations of the blood picture. A further advantage shown by the above-mentioned preparations is the fact that upon oral application the active substance is not separated off in ascertainable amounts in the milk of the animals thus treated.

More recently it became known that bis-(2-hydroxy-3,5,6-trichlorophenyl)-methane appears to be effective against *Fasciola hepatica* (The Veterinary Bulletin 29, 194 [1959]).

The superiority of the compounds of the present inventions is apparent from Table II, wherein the tolerable and curative doses and the therapeutic index are listed, the latter being defined.

$$\frac{\text{Maximum tolerated dose}}{\text{curative dose}} = \text{therapeutic index}$$

TABLE II

| Compound | maximum tolerable doses, mg./kg. albino rat per os | curative doses, mg./kg. albino rat per os | therapeutic index |
|---|---|---|---|
| Bis-(2-hydroxy-3,5,6-trichlorophenyl)-methane | 175 | 50 | 3.5 |
| Hexachlorethane | 7,000 | 250 | 28 |
| 1,3-Bis-(trichloromethyl)-benzene | 2,200 | 30-35 | 62-73 |
| 1,4-Bis-(trichloromethyl)-benzene | 2,800 | 55-60 | 46-50 |

In the field test particularly in sheep, if desired by dosage equipments, it proved advantageous to apply the active substance in a stable and easily homogenizable aqueous suspension ensuring equal doses.

The compositions according to the invention may also be administered in admixture with the food as well as in combination with other anthelmintics, e.g. phenotiazine, piperazine, cyanacetic acid hydrazide.

In view of the strong hydrophobic properties of the trichloromethyl-benzenes the preparations of an orally applicable suspension implies the admixture of appropriate wetting, dispersing, thickening and swelling agents. Simultaneously the size of the particles of the afore-mentioned preparations is decisive for the stability of the suspension and for obtaining an optimal effect.

The powder mixtures of the active substances suspendable in water are prepared by thoroughly admixing appropriate surface-active substances and swelling agents known per se. In order to obtain an optimum effect it is suitable that these substances be added in a certain balanced ratio so that swelling and suspending agents act favorably on each other.

Said powder mixtures are advantageously prepared in the following manner. The above-mentioned trichloromethyl-benzenes are ground until the size of the particles is less than $10\mu$. Then 0.5 to 2.5 percent by weight of complex sorbitol ether-ester dispersing agent (sold under the trade designation of "Tween 20") and 1 to 30 percent by weight of one or of a combination of the following agents are added, i.e. finely dispersed silicic acid, starch, tragacanth, ultra-amylopectine, polyvinyl alcohol, the sodium salt of sulfuric ester of saturated fatty alcohols and talc, and the whole is homogeneously mixed.

These preparations obtained according to the invention can easily be wetted with water. The suspensions obtainable therefrom are stable, do not form any deposits for a prolonged time and can, after stirring or shaking, easily be applied by means of syringes or dosage equipments usual for this purpose.

It is furthermore possible to admix the above-mentioned substances, for instance 1,4-bis-trichloromethyl-benzene, or their appropriate formulation, with other anthelmintics or their formulations.

The following examples serve to illustrate the invention.

*Example 1*

Formulation: Percent
1,4 - bis - (trichloromethyl) - benzene (size of particles below 10μ) _____ 82.5
Complex sorbitol ether-ester dispersing agent_ 1.25
Finely dispersed amorphous silicic acid containing 15% of hydrolysed starch, sold under the trade name of "Aerosil compositum" _____ 6.875
Tragacanth (size of particles below 10μ)___ 9.375

"Tween 20" is homogeneously mixed in a kneader with a part of the 1,4-bis-(trichloromethyl)-benzene. Upon addition of the remaining quantity of 1,4-bis-(trichloromethyl)-benzene and "Aerosil compositum" as well as tragacanth, this mass is homogeneously mixed in a suitable mixer and screened.

*Example 2*

Formulation: Percent
1,4-bis-(trichloromethyl)-benzene (size of particles below 10μ) _____ 85
Complex sorbitol ether-ester dispersing agent____ 1
Ultra-amylpectine _____ 3
"Aerosil compositum"_____ 5
Starch _____ 6

The mixture is prepared in an analogous manner to that described in Example 1.

*Example 3*

Formulation: Percent
1,4-bis-(trichloromethyl)-benzene (size of particles below 10μ) _____ 29.9
Phenotiazine (size of particles below 20μ) ___ 66.2
Polyvinyl alcohol of 98% strength (size of particles below 10μ) _____ 1.4
Sodium salt of sulfuric acid ester of saturated fatty alcohols (size of particles below 10μ)_ 1.1
Talc (size of particles below 20μ) _____ 1.4

The parts are homogeneously mixed in a mixer.

*Example 4*

Formulation: Percent
1,3-bis-(trichloromethyl)-benzene (size of particles below 10μ) _____ 88.5
Complex sorbitol ether-ester dispersing agent__ 2.0
"Aerosil compositum"_____ 6.0
Polyvinyl alcohol_____ 1.5
Talc _____ 2.0

*Example 5*

Formulation: Percent
1,3,5-tris-(trichloromethyl)-benzene (size of particles below 10μ) _____ 86.5
Complex sorbitol ether-ester dispersing agent_ 2.0
"Aerosil compositum"_____ 6.0
Polyvinyl alcohol_____ 1.5
Talc _____ 2.0

As various changes could be made in the above products without departing from the scope of the invention, it is intended that all matter contained in the above description shall be interpreted as illustrative and not in a limiting sense.

We claim:
1. A method of treating animals against liver fluke designated *Fasciola hepatica* which comprises orally administering a composition essentially comprising a member of the group consisting of 1,4-bis-(trichloromethyl)-benzene, 1,3-bis-(trichloromethyl)-benzene, 1,3,5-tris-(trichloromethyl)-benzene and mixtures of said compounds.

2. A method of treating animals against liver fluke designated *Fasciola hepatica* which comprises orally administering a composition essentially comprising 1,4-bis-(trichloromethyl)-benzene.

3. A method of treating animals against liver fluke designated *Fasciola hepatica* which comprises orally administering a composition essentially comprising 1,3-bis-(trichloromethyl)-benzene.

4. A method of treating animals against liver fluke designated *Fasciola hepatica* which comprises orally administering a composition essentially comprising 1,3,5-tris-(trichloromethyl)-benzene.

5. A method of treating animals against liver fluke designated *Fasciola hepatica* which comprises orally administering a suspension of a member of the group consisting of 1,4-bis-(trichloromethyl)-benzene, 1,3-bis-(trichloromethyl)-benzene, 1,3,5-tris-(trichloromethyl)-benzene and mixtures of said compounds and a member of the group consisting of wetting agents, dispersing agents, thickening agents and swelling agents.

6. A method of treating animals against liver fluke designated *Fasciola hepatica* which comprises orally administering a composition essentially comprising a member of the group consisting of 1,4-bis-(trichloromethyl)-benzene, 1,3 - bis - (trichloromethyl) - benzene, 1,3,5-tris-(trichloromethyl)-benzene and mixtures of said compounds in admixture with an animal feed.

7. An animal feed comprising a nutrient material and a member of the group consisting of 1,4-bis-(trichloromethyl)-benzene, 1,3-bis-(trichloromethyl)-benzene, 1,3,5-tris-(trichloromethyl)-benzene and mixtures of said compounds.

References Cited in the file of this patent

Chem. Abst. vol. 30, 1936, pp. 7121–7.